United States Patent
Bian (10) Patent No.: US 11,644,695 B2
(45) Date of Patent: May 9, 2023

(54) EDGE COUPLERS INCLUDING A MATERIAL WITH A TUNABLE REFRACTIVE INDEX

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

(*) Notice: Subject to any disclaimer, the term of this patent is extended or adjusted under 35 U.S.C. 154(b) by 224 days.

(21) Appl. No.: 17/091,394

(22) Filed: Nov. 6, 2020

(65) Prior Publication Data
US 2022/0146862 A1 May 12, 2022

(51) Int. Cl.
| G02F 1/035 | (2006.01) |
| G02B 6/12 | (2006.01) |
| G02B 6/26 | (2006.01) |
| G02B 6/42 | (2006.01) |
| G02B 6/10 | (2006.01) |
| G02F 1/01 | (2006.01) |

(52) U.S. Cl.
CPC .......... *G02F 1/011* (2013.01); *G02F 1/0102* (2013.01); *G02F 1/0126* (2013.01); *G02F 1/0147* (2013.01)

(58) Field of Classification Search
CPC ...... G02F 1/011; G02F 1/0102; G02F 1/0126; G02F 1/0147
USPC .... 385/2, 5, 14, 24, 28, 37, 43, 47, 50, 123, 385/129
See application file for complete search history.

(56) References Cited

U.S. PATENT DOCUMENTS

| 6,393,185 | B1* | 5/2002 | Deacon | G02B 6/12004 |
| | | | | 385/12 |
| 6,795,622 | B2* | 9/2004 | Forrest | H01S 5/1032 |
| | | | | 372/6 |
| 10,816,726 | B1 | 10/2020 | Peng et al. | |
| 2008/0080808 | A1* | 4/2008 | Tolshikhin | G02B 6/1228 |
| | | | | 257/E31.022 |
| 2021/0126429 | A1* | 4/2021 | Venkatesan | H01S 5/02326 |

OTHER PUBLICATIONS

Peng et al., "Optical Fiber Coupler Having Hybrid Tapered Waveguide Segments and Metamaterial Segments", U.S. Appl. No. 16/724,507, filed Dec. 23, 2019.
Cheben et al., "Refractive index engineering with subwavelength gratings for efficient microphotonic couplers and planar waveguide multiplexers", Optics Letters vol. 35, Issue 15, pp. 2526-2528 (2010).

(Continued)

*Primary Examiner* — Kaveh C Kianni
*Assistant Examiner* — Hung Q Lam
(74) *Attorney, Agent, or Firm* — Thompson Hine LLP; Francois Pagette (57) ABSTRACT

Structures including an edge coupler and methods of fabricating a structure including an edge coupler. The edge coupler includes a waveguide core having an end surface that terminates proximate to an edge of a substrate. The waveguide core contains a material having a first state with a first refractive index in response to an applied stimulus and a second state with a second refractive index different from the first refractive index.

19 Claims, 6 Drawing Sheets

(56) References Cited

OTHER PUBLICATIONS

Barwicz, et al., "An O-band Metamaterial Converter Interfacing Standard Optical Fibers to Silicon Nanophotonic Waveguides," in Optical Fiber Communication Conference, OSA Technical Digest (online) (Optical Society of America, 2015), paper Th3F.3.
Peng, et al., "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.
Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.
Bian et al. "Towards low-loss monolithic silicon and nitride photonic building blocks in state-of-the-art 300mm CMOS foundry" OSA Frontiers in Optics (FIO), FW5D.2, Sep. 2020.
Mu, X.; Wu, S.; Cheng, L.; Fu, H., "Edge Couplers in Silicon Photonic Integrated Circuits: A Review", Published Feb. 24, 2020, Appl. Sci. 10, 1538.

\* cited by examiner

EDGE COUPLERS INCLUDING A MATERIAL WITH A TUNABLE REFRACTIVE INDEX

BACKGROUND

The present invention relates to photonics chips and, more specifically, to structures including an edge coupler and methods of fabricating a structure including an edge coupler.

Photonics chips are used in many applications and systems including data communication systems and data computation systems. A photonics chip integrates optical components, such as waveguides, optical switches, edge couplers, and polarizers, and electronic components, such as field-effect transistors, into a unified platform. Among other factors, layout area, cost, and operational overhead may be reduced by the integration of both types of components.

An edge coupler is commonly used for coupling laser light between an optical fiber and optical components on the photonics chip. The edge coupler may include a narrowed section of a waveguide core that has a significantly smaller mode size than the beam of laser light emitted by the optical fiber. Although optical fibers may be manufactured with different mode sizes, conventional edge couplers have a fixed mode size that restricts compatibility. Inefficiencies in the optical coupling between the optical fiber and the edge coupler may occur due to the mismatched mode size, as well as differences in mode shape. In addition, manufacturing imperfections causing packaging errors may result in misalignment between the optical fiber and edge coupler. These inefficiencies, and others, may give rise to a significant coupling loss. Unfortunately, conventional edge couplers are not tunable such that optical fibers with different mode sizes can be accommodated or such that the adverse impact of manufacturing and packaging errors can be alleviated.

Improved structures including an edge coupler and methods of fabricating a structure including an edge coupler are needed.

SUMMARY

In an embodiment of the invention, a structure includes an edge coupler having a waveguide core with an end surface that terminates adjacent to an edge of a substrate. The waveguide core is comprised of a material having a first state with a first refractive index in response to an applied stimulus and a second state with a second refractive index different from the first refractive index.

In an embodiment of the invention, a method includes forming an edge coupler including a waveguide core having an end surface that terminates adjacent to an edge of a substrate. The waveguide core is comprised of a material having a first state with a first refractive index in response to an applied stimulus and a second state with a second refractive index different from the first refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
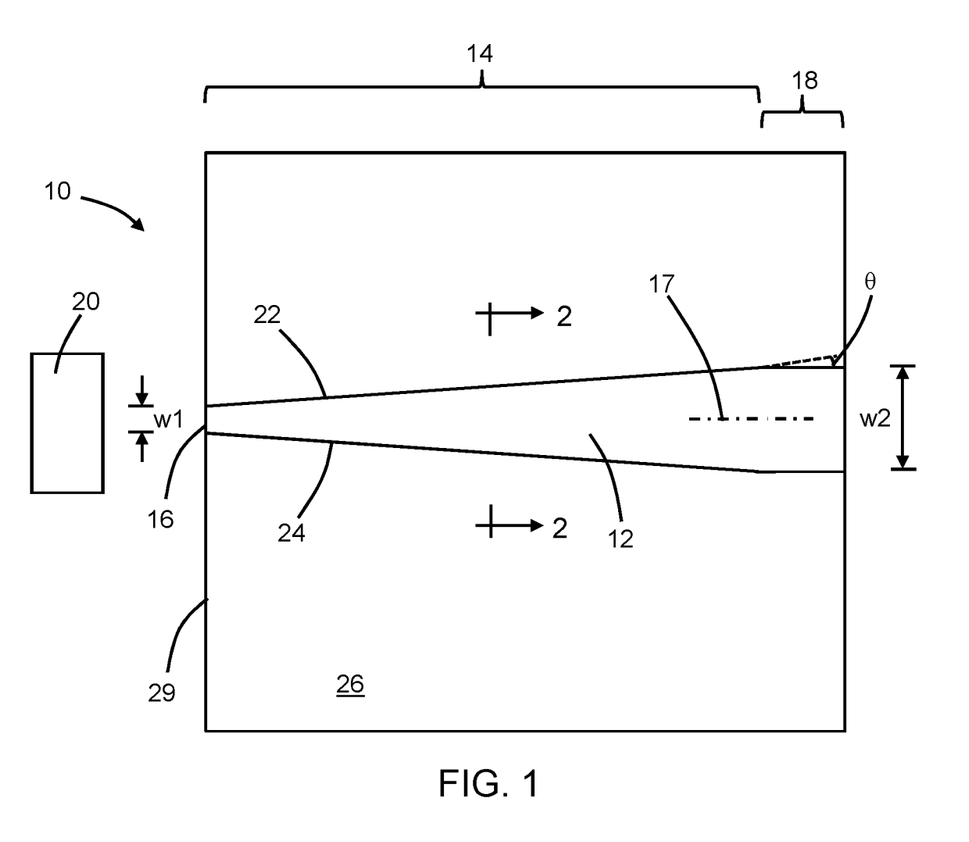
FIG. 1 is a top view of a structure at an initial fabrication stage of a processing method in accordance with embodiments of the invention.
Figure 2:
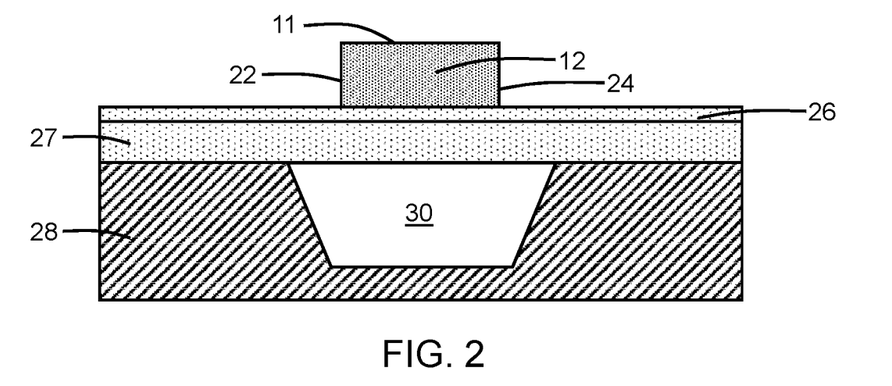
FIG. 2 is a cross-sectional view of the structure taken generally along line 2-2 in FIG. 1.

With reference to FIGS. 1, 2 and in accordance with embodiments of the invention, a structure 10 for an edge coupler includes a waveguide core 12 having a tapered section 14, an end surface 16 that is positioned adjacent to an optical fiber 20, and a non-tapered section 18 adjoined and connected to the tapered section 14. The non-tapered section 18 of the waveguide core 12 may be a straight section located immediately adjacent to the tapered section 14. The waveguide core 12 may be extend longitudinally with alignment along a longitudinal axis 17. In the representative embodiment, the end surface 16 terminates the tapered section 14.

Laser light may be directed from the optical fiber 20 toward the end surface 16 of the waveguide core 12. The laser light may have a given wavelength, intensity, mode shape, and mode size. The gap or space between the optical fiber 20 and the end surface 16 of the waveguide core 12 may be filled by air or, alternatively, may be filled by an index-matching material or may include a lens. The end surface 16 provides a surface of given cross-sectional area that is butted with the optical fiber 20, which may have a larger cross-sectional area, and that participates in receiving laser light emitted from the optical fiber 20.

The tapered section 14 may extend lengthwise parallel to the longitudinal axis 17 from the end surface 16 to an opposite end at a transition to the non-tapered section 18. The tapered section 14 has a length measured as a distance along the longitudinal axis 17 from the end surface 16 to the transition between the tapered section 14 and the non-tapered section 18. The waveguide core 12 includes a top surface 11 and opposite sidewalls or side surfaces 22, 24 that diverge with increasing distance from the end surface 16 over the length of the tapered section 14 to define an inverse taper in a direction of light propagation. The separation between the side surfaces 22, 24 of the waveguide core 12 may be constant in the non-tapered section 18 proximate to the transition with the tapered section 14. In the representative embodiment, the tapered section 14 is tapered with an inverse taper characterized by a taper angle ($\theta$). In alternative embodiments, the tapered section 14 may be tapered with an inverse taper characterized by multiple stages having different taper angles.

The tapered section 14 of the waveguide core 12 may have a width dimension equal to a minimum width, W1, at the end surface 16 and equal to a maximum width, W2, at the transition to the non-tapered section 18. In an embodiment, the width dimension of the tapered section 14 may vary over its length between the width, W1, and the width, W2, based on a linear function. In an alternative embodiment, the width dimension of the tapered section 14 may vary over its length between the width, W1, and the width, W2, based on a non-linear function, such as a quadratic, parabolic, or exponential function.

The waveguide core 12 may be arranged over a dielectric layer 26, which may be comprised of silicon dioxide. In an embodiment, the dielectric layer 26 may be disposed on a buried oxide layer 27 of a silicon-on-insulator (SOI) substrate that further includes a substrate 28 comprised of a single-crystal semiconductor material, such as single-crystal silicon. The substrate 28 has an edge 29 and the end surface 16 of the waveguide core 12 terminates adjacent to the edge 29. In an embodiment, the substrate 28 may include a groove 30 at the edge 29 of the substrate 28 that extends beneath the dielectric layer 26 and buried oxide layer 27 as an under-cut immediately adjacent to the end surface 16 of the waveguide core 12. A tip of the optical fiber 20 may be inserted and supported at least in part by the lower portion of the groove 30 adjacent to the end surface 16 of the waveguide core 12. Alternatively, the groove 30 may be omitted.

The waveguide core 12 may be comprised of an active material having an index of refraction (i.e., refractive index) that can be tuned (i.e., changed or varied) by the application of an applied stimulus. In an embodiment, the waveguide core 12 may be comprised of a material characterized by a refractive index that reversibly varies among discrete states characterized by significantly different refractive indices in the presence and absence of the applied stimulus. For example, pump light 31 may be supplied as the applied stimulus from a light source 33, such as an external laser. In an embodiment, the refractive index of the active material may exhibit multiple discrete states in which the real parts and the imaginary parts are significantly different. For example, the refractive index of the active material may have a higher real part and a lower imaginary part in one state than another state. In an embodiment, the refractive index of the active material may be characterized by a lower real part and a higher imaginary part when the pump light 31 is provided.

In an embodiment, the waveguide core 12 may be comprised of indium-tin oxide for which the real part and imaginary parts of its refractive index may respectively be equal to about 2 and about zero in the absence of the applied stimulus, and the real part and imaginary parts of its refractive index may respectively be equal to about 1 and about 0.3 with the applied stimulus provided. In an alternative embodiment, the waveguide core 12 may be comprised of a polymer.

Figure 3:
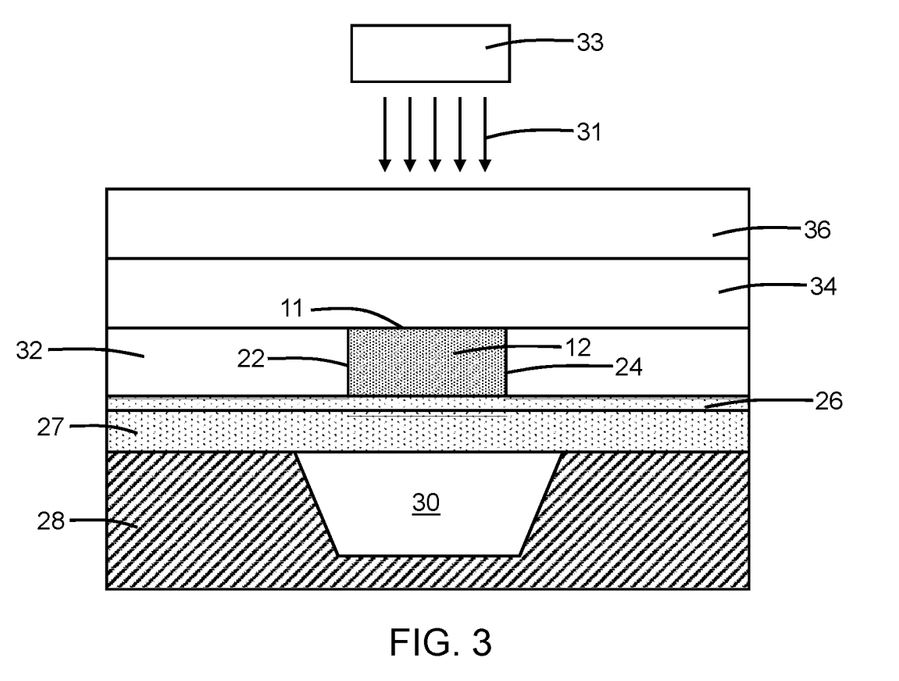
FIG. 3 is a cross-sectional view of the structure at a fabrication stage subsequent to FIG. 2.

With reference to FIG. 3 in which like reference numerals refer to like features in FIGS. 1, 2 and at a subsequent fabrication stage, a dielectric layer 32 is formed over the waveguide core 12. The dielectric layer 32 may be comprised of a dielectric material, such as silicon dioxide, deposited by chemical vapor deposition and planarized by, for example, chemical-mechanical polishing to remove topography. Below its top surface 11, the waveguide core 12 is surrounded by the dielectric material of the dielectric layer 32.

A dielectric layer 34 may be formed over the waveguide core 12 and dielectric layer 32. In an embodiment, the dielectric layer 34 may be comprised of silicon dioxide. A back-end-of-line stack 36 is formed over the dielectric layer 34. The back-end-of-line stack 36 includes one or more interlayer dielectric layers that may be comprised of dielectric material, such as silicon dioxide.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

In use, laser light from the optical fiber 20 may enter the structure 10 at and proximate to the end surface 16. The structure 10 may be switched to a given condition or state by selectively applying the pump light 31 as an applied stimulus to the active material contained in the waveguide core 12 proximate to the end surface 16. In a state in which the pump light 31 is not applied, the structure 10 may be tuned to mode match with the laser light output by the optical fiber 20. In a state in which the pump light 31 is applied, the structure 10 may be tuned to mode match with the laser light output by a different optical fiber 20. The tunability of the structure 10 may permit the light transfer from the different optical fibers 20 to the structure 10 to be optimized to match different fiber modes. For example, the structure 10 may be optimized for optical coupling with a larger fiber mode in the absence of the pump light 31 and, alternatively, the structure 10 may be optimized for optical coupling with a small fiber mode when the pump light 31 is applied.

The structure 10 provides a monolithically-integrated edge coupler for efficient butt-end light coupling with the optical fiber 20. The structure 10 may improve mode matching (i.e., the matching of mode shape and/or mode size) with the laser light output by the optical fiber 20 to enhance the efficiency of the light coupling. The tunability of the structure 10 may permit the light transfer from the optical fiber 20 to the structure 10 to be optimized to match different fiber modes.

Figure 4:
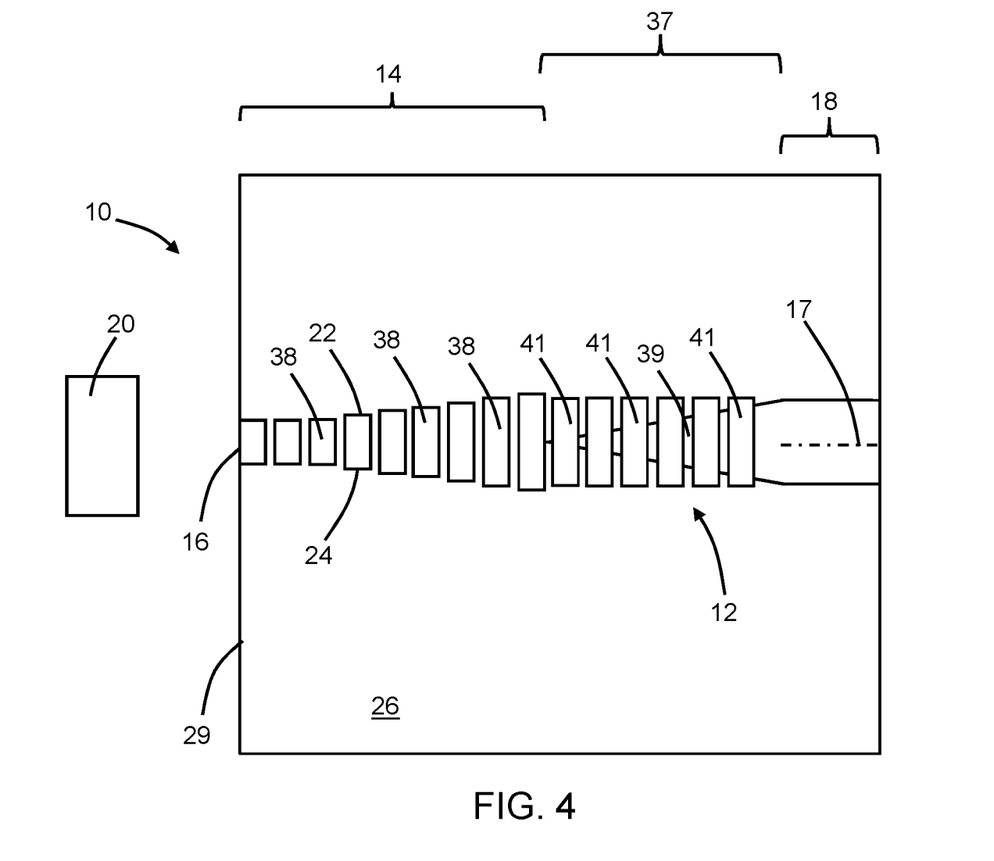
FIG. 4 is a top view of a structure in accordance with alternative embodiments of the invention.

With reference to FIG. 4 in which like reference numerals refer to like features in FIG. 1 and in accordance with alternative embodiments of the invention, the tapered section 14 of the waveguide core 12 may be divided into multiple segments 38 that are laterally spaced along the longitudinal axis 17 with a given pitch and separated by gaps. A tapered section 37 may be added between the tapered section 14 and non-tapered section 18 that includes segments 41 separated by gaps and a taper 39 that is overlaid with segments 41. The segments 38, the taper 39, and the segments 41 may be defined during the lithography and etching processes forming the waveguide core 12. The segments 38 have individual width dimensions in a direction transverse to the longitudinal axis 17 that provide the tapering of the tapered section 14. In an embodiment, the width dimensions of the segments 38 in the tapered section 14 may increase with increasing distance from the end surface 16. In an embodiment, the width dimensions of the segments 38 in the tapered section 14 may vary based on a linear function. In an embodiment, the width dimensions of the segments 38 in the tapered section 14 may vary based on a non-linear function, such as a quadratic, parabolic, or exponential function, such that the tapering is non-linear. In an embodiment, the width dimensions of the segments 38 in the tapered section 14 may vary over a portion of its length based on a linear function and over a portion of its length based on a non-linear function.

The segments 38 and segments 41 of the waveguide core 12 may be characterized by optical properties (e.g., refractive index) that differ from bulk optical properties, commonly referred to as a metamaterial. In an embodiment, the pitch of the segments 38 may be less than the wavelength of the laser light being received by the structure 10 from the optical fiber 20.

In the representative embodiment, the segments 38 and segments 41 have a rectangular or substantially rectangular geometrical shape in a direction normal to the top surface 11. In alternative embodiments, the segments 38 and segments 41 may have a non-rectangular geometrical shape, such as an oval geometrical shape in a direction normal to the top surface 11. In alternative embodiments, the segments 38 and segments 41 may have a different rectangular geometrical shape, such as a trapezoidal geometrical shape in a direction normal to the top surface 11. In the representative embodiment, the segments 38 and segments 41 have a constant pitch and duty cycle that is uniform in a direction along the longitudinal axis 17. In alternative embodiments, the pitch and/or duty cycle of the segments 38 and segments 41 may be apodized (i.e., non-uniform).

Figure 5:
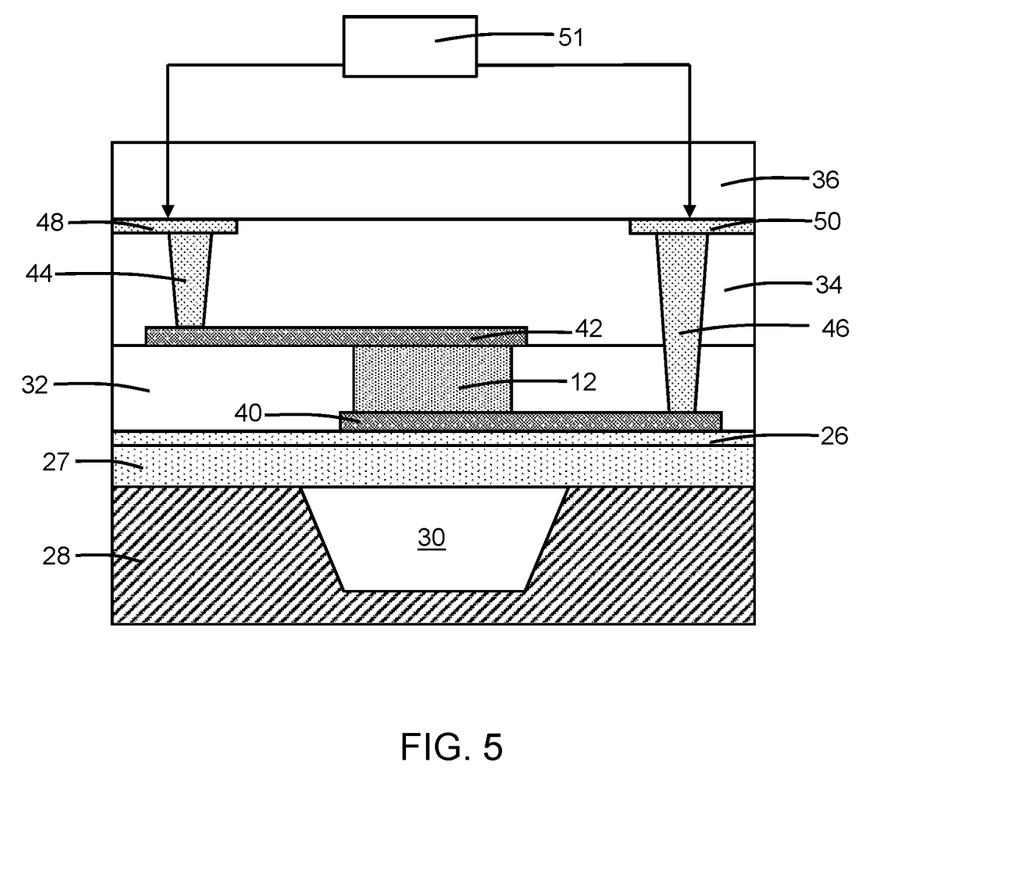
FIG. 5 is a cross-sectional view of a structure in accordance with alternative embodiments of the invention.

With reference to FIG. 5 in which like reference numerals refer to like features in FIG. 3 and in accordance with alternative embodiments of the invention, the structure 10 may be altered to include an electrode 40 and an electrode 42 to which a bias potential can be applied as the applied stimulus to tune the refractive index of the active material of the waveguide core 12. In an embodiment, the tapered section 14 of the waveguide core 12 may be positioned between the electrode 40 and the electrode 42. In an embodiment, the electrode 42 may be positioned in part on the top surface 11 of the waveguide core 12 and the electrode 40 may be positioned in part between a bottom surface of the waveguide core 12 and the dielectric layer 26. The electrodes 40, 42 may be comprised of a transparent oxide material, such as indium-tin oxide, zinc oxide, or indium-zinc oxide, that is an electrical conductor.

A contact 44 is formed in the dielectric layer 34 that connects the electrode 42 with a wire 48, and a contact 46 is formed in the dielectric layers 32, 34 that connects the electrode 40 with a wire 50. The wires 48, 50 are coupled to a power supply 51 configured to apply and remove the bias voltage used to tune the refractive index of active material of the waveguide core 12. Through these connections, a switchable bias voltage may be applied from the wires 48, 50 to energize the electrodes 40, 42 and generate the electric field that can produce the change in the refractive index of the active material contained in at least the tapered section 14 of the waveguide core 12, and removed to deenergize the electrodes 40, 42 and reverse the refractive index change. In an embodiment, the bias voltage changes the refractive index of the active material contained in the tapered section 14 of the waveguide core 12. The contacts 44, 46 and wires 48, 50 are positioned relative to the structure 10 so as to not interfere with its operation.

Figure 6:
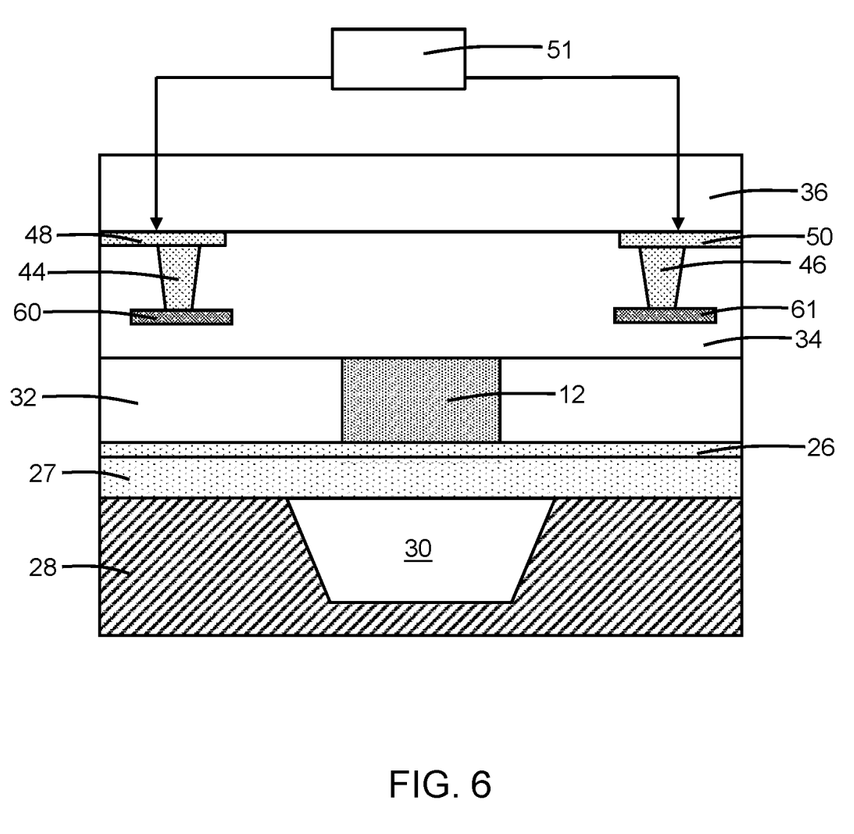
FIG. 6 is a cross-sectional view of a structure in accordance with alternative embodiments of the invention.

With reference to FIG. 6 in which like reference numerals refer to like features in FIG. 3 and in accordance with alternative embodiments of the invention, thin film resistors 60, 61 may be formed in the dielectric layer 34 adjacent to the waveguide core 12. The thin film resistor 60, 61 may be respectively connected by the contacts 44, 46 with the wires 48, 50. The thin film resistors 60, 61 provide resistance heaters that respond to an applied current with Joule heating. The thin film resistors 60, 61 may be comprised of a material, such as nickel-chromium, tantalum nitride, or titanium nitride, that is characterized by a sufficient electrical resistance to provide the desired Joule heating. Heat from the thin film resistors 60, 61 may be used as an applied stimulus to change the temperature of the active layer 14 and provide the different refractive indices effective for light modulation within the structure 10. In an embodiment, the thin film resistor 60 and the thin film resistor 61 may be symmetrically arranged relative to the waveguide core 12.

The active material of the waveguide core 12 may be characterized by a temperature-dependent refractive index. In an embodiment, the waveguide core 12 may be comprised of a phase-change material having an index of refraction that reversibly varies in response to changes in its temperature among discrete states characterized by significantly different refractive indices. The state change of the phase-change material may be precipitated by small temperature changes about (i.e., above and below) the transition temperature. In an embodiment, after the temperature is increased above the transition temperature, the phase of the phase-change material may change during cooling to either an amorphous phase or a crystalline phase, which are characterized by different refractive indices, contingent upon the cooling rate. In an embodiment, the amorphous phase of the phase-change material may be formed by fast cooling, and the crystalline phase of the phase-change material may be formed by slow cooling. In an embodiment, the waveguide core 12 may be comprised of vanadium oxide. In an embodiment, the waveguide core 12 may be comprised of germanium-antimony-tellurium.

The index of refraction of a portion of the waveguide core 12 may be tuned as a function of the temperature of the phase-change material. To that end, a current may be applied from the power supply 51 to energize the thin film resistors 60, 61 to produce heat by Joule heating. Heat transferred from the thin film resistors 60, 61 to the waveguide core 12 causes the temperature of the phase-change material in at least the tapered section 14 of the waveguide core 12 to increase. The rate of heat energy transfer (i.e., heat flux) may be reduced or discontinued by deenergizing the thin film resistors 60, 61 to allow the phase-change material to cool. In an embodiment, the heating may elevate the temperature of the phase-change material above its transition temperature, and different cooling rates may provide the states of different refractive index.

Figure 7:
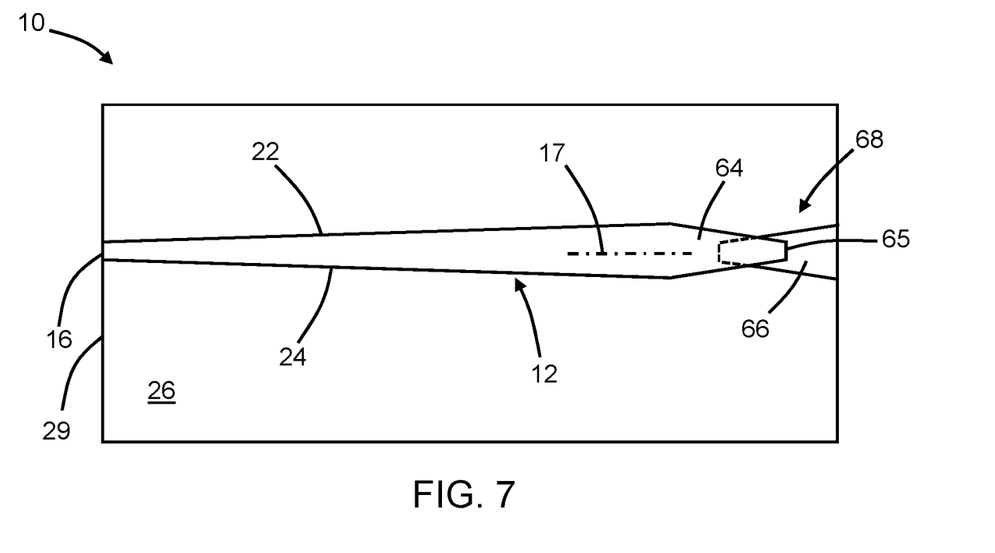
FIG. 7 is a top view of a structure in accordance with alternative embodiments of the invention.

With reference to FIG. 7 in which like reference numerals refer to like features in FIG. 1 and in accordance with alternative embodiments of the invention, the waveguide core 12 may include a taper 64 that is located along the longitudinal axis 17 at an end of the waveguide core 12 opposite to the end surface 16. The waveguide core 12 may be terminated by an end surface 65 located at the tip of the taper 64. The taper 64 of the waveguide core 12 is positioned adjacent to a taper 66 of a waveguide core 68 in an optical coupling region of the structure 10. In an embodiment, the taper 64 may be positioned in part in an overlapping arrangement with the taper 66. The taper 66 of the waveguide core 68 may be arranged relative to the taper 64 waveguide core 12 along the longitudinal axis 17 of the waveguide core 12. In an embodiment, the waveguide core 68 may be comprised of a non-tunable material, such as silicon or silicon nitride. In an embodiment, the waveguide core 68 may be patterned from a layer of the non-tunable material by lithography and etching processes before the waveguide core 12 is patterned. Light received by the structure 10 from the optical fiber 20 (FIG. 1) is transferred from a portion of the waveguide core 12 including the taper 64 to a portion of the waveguide core 68 including the taper 66 by vertical optical coupling.

Figure 8:
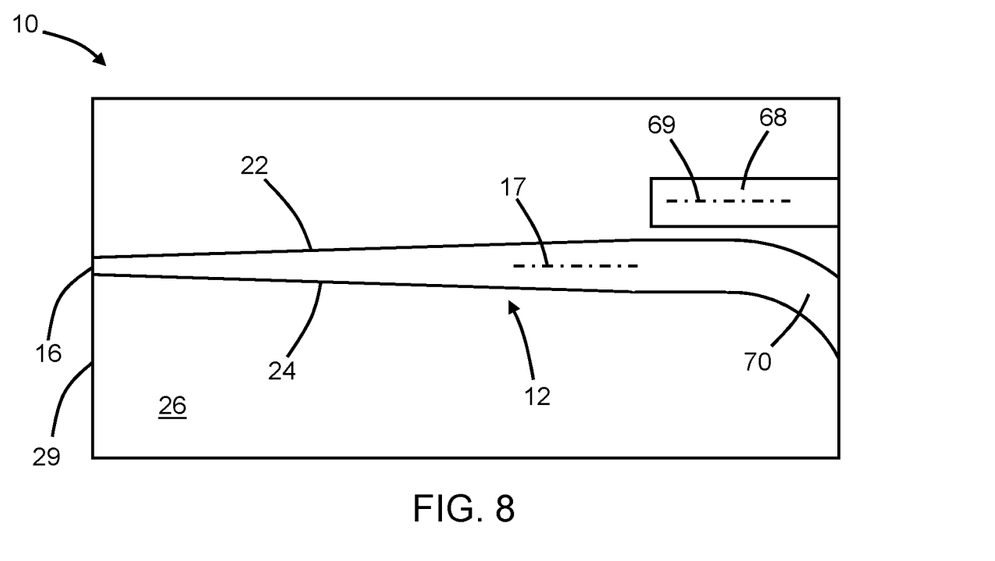
FIG. 8 is a top view of a structure in accordance with alternative embodiments of the invention.

With reference to FIG. 8 in which like reference numerals refer to like features in FIG. 1 and in accordance with alternative embodiments of the invention, a portion of the waveguide core 12 may be positioned adjacent to a portion of the waveguide core 68 in an optical coupling region of the structure 10. The adjacent portion of the waveguide core 68 may be aligned along a longitudinal axis 69 that is parallel to the longitudinal axis 17 of the waveguide core 12. Light received by the structure 10 from the optical fiber 20 (FIG. 1) is transferred from the adjacent portion of the waveguide core 12 to the waveguide core 68 by lateral optical coupling. The waveguide core 12 may further include a bend 70 that increases the spacing between the waveguide core 12 and the waveguide core 68 in order to eliminate optical coupling between the waveguide cores 12, 68.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a substrate having an edge; and
an edge coupler including a first waveguide core having an end surface that terminates adjacent to the edge of the substrate, the first waveguide core including a tapered section that is terminated by the end surface, the tapered section having a width dimension that increases with increasing distance from the end surface, and the first waveguide core comprising a first material having a first state with a first refractive index in response to an applied stimulus and a second state with a second refractive index different from the first refractive index, the first refractive index having a first real part and a first imaginary part, the second refractive index having a second real part different from the first real part, and the second refractive index having a second imaginary part different from the first imaginary part.

2. The structure of claim 1 wherein the first material of the first waveguide core is indium-tin oxide.

3. The structure of claim 1 wherein the first material of the first waveguide core is vanadium oxide or germanium-antimony-tellurium.

4. The structure of claim 1 wherein the edge coupler includes a first electrode and a second electrode, and the first waveguide core includes a portion positioned between the first electrode and the second electrode.

5. The structure of claim 4 further comprising:
a dielectric layer over the first waveguide core;
a first contact in the dielectric layer, the first contact coupled to the first electrode; and
a second contact in the dielectric layer, the second contact coupled to the second electrode.

6. The structure of claim 5 further comprising:
a power supply coupled by the first contact to the first electrode and by the second contact to the second electrode, the power supply configured to apply a bias voltage as the applied stimulus to the first electrode and the second electrode to provide the first state and to remove the bias voltage from the first electrode and the second electrode to provide the second state.

7. The structure of claim 1 further comprising:
a dielectric layer over the first waveguide core; and
a resistance heater positioned in the dielectric layer adjacent to the first waveguide core, the resistance heater configured to generate heat that is transferred through the dielectric layer as the applied stimulus to the first material of the first waveguide core.

8. The structure of claim 1 wherein the first waveguide core includes a longitudinal axis, and the tapered section of the first waveguide core includes a plurality of segments that are arranged along the longitudinal axis.

9. The structure of claim 8 wherein each segment has a width dimension in a direction normal to the longitudinal axis, and the width dimension of the segments in the tapered section varies based on a non-linear function.

10. The structure of claim 1 further comprising:
a second waveguide core adjacent to the first waveguide core, the second waveguide core comprising a second material having a different composition than the first material of the first waveguide core.

11. The structure of claim 10 wherein the second waveguide core includes a portion that is laterally adjacent to a portion of the first waveguide core.

12. The structure of claim 10 wherein the first waveguide core includes a longitudinal axis and a taper spaced along the longitudinal axis from the end surface, and the second waveguide core includes a taper that is positioned to overlap with the taper of the first waveguide core.

13. The structure of claim 1 further comprising:

a light source configured to supply pump light to the first waveguide core as the applied stimulus.

14. A method comprising:

forming an edge coupler including a waveguide core having an end surface that terminates proximate to an edge of a substrate, wherein the waveguide core is formed with a tapered section that is terminated by the end surface, the tapered section has a width dimension that increases with increasing distance from the end surface, the waveguide core comprises a material having a first state with a first refractive index in response to an applied stimulus and a second state with a second refractive index different from the first refractive index, the first refractive index has a first real part and a first imaginary part, the second refractive index has a second real part different from the first real part, and the second refractive index has a second imaginary part different from the first imaginary part.

15. The method of claim 14 further comprising:

forming a first electrode and a second electrode of the edge coupler, wherein the waveguide core includes a portion positioned between the first electrode and the second electrode.

16. The method of claim 14 wherein the waveguide core includes a longitudinal axis, and the tapered section of the waveguide core is patterned to include a plurality of segments that are arranged along the longitudinal axis adjacent to the end surface.

17. The structure of claim 1 wherein the second state with the second refractive index is in response to the absence of the applied stimulus.

18. The structure of claim 1 wherein the first real part of the first refractive index is less than the second real part of the second refractive index, and the first imaginary part of the first refractive index is greater than the second imaginary part of the second refractive index.

19. The structure of claim 1 further comprising:

an optical fiber positioned adjacent to the end surface of the first waveguide core.

* * * * *